(12) United States Patent
Reid et al.

(10) Patent No.: US 12,555,402 B2
(45) Date of Patent: Feb. 17, 2026

(54) METHODS AND SYSTEMS FOR PERFORMING DATA CAPTURE

(71) Applicant: BLUE PRISM LIMITED, Warrington (GB)

(72) Inventors: John Edward Reid, London (GB); Miguel André Aroca-Ouellette, London (GB); Petar Marinov Petrov, London (GB)

(73) Assignee: BLUE PRISM LIMITED, Warrington (GB)

( * ) Notice: Subject to any disclaimer, the term of this patent is extended or adjusted under 35 U.S.C. 154(b) by 302 days.

(21) Appl. No.: 18/319,785

(22) Filed: May 18, 2023

(65) Prior Publication Data

US 2023/0394865 A1 Dec. 7, 2023

(30) Foreign Application Priority Data

Jun. 6, 2022 (EP) ..................... 22177366

(51) Int. Cl.
*G06V 30/416* (2022.01)
*G06V 10/70* (2022.01)
*G06V 30/19* (2022.01)

(52) U.S. Cl.
CPC ............ *G06V 30/416* (2022.01); *G06V 10/70* (2022.01); *G06V 30/19093* (2022.01); *G06V 30/19147* (2022.01)

(58) Field of Classification Search
CPC .................. G06V 30/416; G06V 10/70; G06V 30/19147; G06V 30/19093
See application file for complete search history.

(56) References Cited

U.S. PATENT DOCUMENTS

| | | | | |
|---|---|---|---|---|
| 2020/0334456 A1* | 10/2020 | Sridharan | ........... | G06F 18/2411 |
| 2022/0366251 A1* | 11/2022 | Subramanian | ......... | G06N 3/045 |
| 2022/0366317 A1* | 11/2022 | Gao | ...................... | G06N 20/20 |
| 2023/0065915 A1* | 3/2023 | Berestovsky | ...... | G06V 30/1448 |

OTHER PUBLICATIONS

Rodriguez et al.; "SIFT-AID: Boosting Sift With an Affine Invariant Descriptor Based on Convolutional Neural Networks"; IEEE Int'l Conf. on Image Processing; 2019; p. 4225-4229.
International Patent Application No. PCT/EP2023/065079; Int'l Search Report and the Written Opinion; dated Jul. 18, 2023; 19 pages.

(Continued)

*Primary Examiner* — Lixi C Simpson
(74) *Attorney, Agent, or Firm* — BakerHostetler

(57) ABSTRACT

There is provided a method (100) for performing data capture in an unlabelled document based on a labelled document, wherein the labelled document contains one or more elements each labelled with respect to a field. The method comprises: determining (S110) one or more anchors, wherein an anchor comprises a pair of points that match between the labelled document and the unlabelled document; generating (S120) an overall kernel using the determined one or more anchors; and identifying (S130), using the overall kernel in a kernel machine, one or more elements to be captured in the unlabelled document, wherein the one or more elements to be captured correspond in field to the one or more labelled elements contained in the labelled document.

20 Claims, 13 Drawing Sheets

(56) References Cited

OTHER PUBLICATIONS

Tsai et al.; "Visual Text Features for Image Matching"; IEEE Int'l Symposium on Multimedia; 2012; p. 408-412.
D. Duvenaud; "Automatic Model Construction with Gaussian Processes"; University of Cambridge; Dissertation; Jun. 2014; 157 pages.
D. Duvenaud; "The Kernel Cookbook: Advice on Covariance functions"; https://www.cs.toronto.edu/-duvenaud/cookbook/; accessed Oct. 18, 2022; 11 pages.
Smith et al.; "tesseract-ocr/tesseract"; https://github.com/tesseract-ocr/tesseract/blob/main/doc/tesseract.1.asc#config-files-and-augmenting-with-user-data; Github; accessed Oct. 18, 2022; 10 pages.

\* cited by examiner

FIG. 3A

Unlabelled document

Invoice #: 00123457
Invoice date: 3 Sept 2021

| Description | Quantity | Unit cost | Amount |
|---|---|---|---|
| Sony ZV-1 | 1 | 699 | 699 |
| | | Total | 699 |

Labelled document

_310_

Invoice #: [00123456] ~311
Invoice date: [2 Sept 2021] ~312

| Description | Quantity | Unit cost | Amount |
|---|---|---|---|
| [Canon 5D] ~313A | [1] ~314A | [2499] ~315A | [2499] ~316A |
| [Memory card] ~313B | [2] ~314B | [149] ~315B | [298] ~316B |
| [Lens] ~313C | [1] ~314C | [1799] ~315C | [1799] ~316C |
| | | Total | [4596] ~316i / ~317 |

Invoice #:  00123456 —311
Invoice date:  2 Sept 2021 —312

Description  Quantity  Unit cost  Amount
   313A        314A     315A      316A
  Canon 5D     [1]      2499      2499
  Memory card  [2]      149       298 —316B
   313B        314B     315B
  Lens         [1]      1799      1799 —316C
   313C        314C     315C
                        Total     4596
                                  317

Labelled document

_320_

Invoice #:  00123457 —321
Invoice date:  3 Sept 2021 —322

Description  Quantity  Unit cost  Amount
                                  326
  Sony ZV-1    [1]      699       699
   323        324       325       327
                        Total

Unlabelled document

| Invoice #: | 00123456 |
| Invoice date: | 2 Sept 2021 |

| Description | Quantity | Unit cost | Amount |
|---|---|---|---|
| Canon 5D | 1 | 2499 | 2499 |
| Memory card | 2 | 149 | 298 |
| Lens | 1 | 1799 | 1799 |
| | | Total | 4596 |

*520*

| Invoice #: | 00123457 |
| Invoice date: | 3 Sept 2021 |

| Description | Quantity | Unit cost | Amount |
|---|---|---|---|
| Sony ZV-1 | 1 | 699 | 699 |
| | | Total | 699 | anchor

INVOICE
Invoice Reference: 237481709 — 611
Purchase Order: 855496
Invoice Date: Apr 14 95
Due Date: May 16 95

Bridge Interiors
56 Bridge Ln — 612
Ilkley LS29 9EU

613 — Total Due | Due Date
£1901.98 | May 16 95 — 614

| | Description | Cost | Qty | Discount | VAT | Amount |
|---|---|---|---|---|---|---|
| 615 | Energy Bar | 12.93 | 3 | 18.00% | 4.77 | 36.57 |
| | 100% Juice Apple Grape | 47.15 | 3 | 4.99% | 20.16 | 154.54 |
| | Five Cheese Tortelloni with Parmigiano Reggiano | 74.17 | 3 | 15.43% | 26.23 | 216.41 |
| | Slimline CD Jewel Cases | 87.31 | 5 | 11.67% | 57.84 | 443.46 |
| | Eye Makeup-up Remover Pads | 39.22 | 5 | 11.98% | 25.89 | 198.52 |
| | Hydrating Day Cream All Bright SPF 15 | 71.99 | 3 | 16.32% | 27.11 | 207.82 |
| | Natural Mineral Water | 19.25 | 4 | 12.22% | 10.14 | 77.72 |
| | Intercontinental Distilleries Ltd | 97.09 | 3 | 12.40% | 38.27 | 293.43 |
| | Natural Nine Grain Bread | 42.04 | 4 | 1.03% | 24.97 | 191.40 |
| | Rose Deep Cleansing Nose Strips | 14.59 | 3 | 11.69% | 5.80 | 44.46 |
| | Pepper Mayonnaise | 8.18 | 5 | 19.92% | 4.91 | 37.84 |

Labelled Document

Subtotal £1872.45
Discount: £218.56
VAT: £248.08
Total due: £1901.98

Company ID: 549852
VAT No: 50510

Website: TODO.com
Telephone: 696-028-8629

INVOICE

Invoice Reference: 614871043
Purchase Order: 725824
Invoice Date: Apr 27 2277
Due Date: May 31 2277

Fred White & Co (Bristol) Ltd
140 Gloucester Rd
Bristol BS7 8AX

| Total Due | Due Date |
|---|---|
| £528.12 | May 31 2277 |

| Description | Cost | Qty | Discount | VAT | Amount |
|---|---|---|---|---|---|
| Surdegsbrödmix | 17.73 | 6 | 18.86% | 12.95 | 99.25 |
| Protein Plus Bar Cookies & Cream Flavour | 2.54 | 8 | 4.84% | 2.90 | 22.22 |
| Onion Rings | 48.91 | 3 | 10.99% | 19.59 | 150.21 |
| Diphenhydramine HCl 25mg/ anitihistamine | 77.16 | 3 | 3.67% | 33.45 | 256.43 |

New Unlabelled Document

| | |
|---|---|
| Subtotal | £504.89 |
| Discount: | £45.65 |
| VAT: | £68.89 |
| Total due: | £528.12 |

Company ID: 151007
VAT No: 20139

Website: TODO.com
Telephone: (+1)306-378-716

INVOICE
Invoice Reference: 237491709
Purchase Order: 655496
Invoice Date: Apr 14 95
Due Date: May 16 95

| Total Due | Due Date |
|---|---|
| £1901.96 | May 16 95 |

Bridge Interiors
56 Bridge Ln
Ilkley LS29 9EU

| Description | Cost | Qty | Discount | VAT | Amount |
|---|---|---|---|---|---|
| Energy Bar | 12.93 | 3 | 18.00% | 4.77 | 36.57 |
| 100% Juice Apple Grape | 47.15 | 3 | 4.99% | 20.16 | 154.54 |
| Five Cheese Tortelloni with Parmigiano Reggiano | 74.17 | 3 | 15.43% | 28.23 | 216.41 |
| Slimline CD Jewel Cases | 87.31 | 5 | 11.67% | 57.84 | 443.46 |
| Eye Makeup-up Remover Pads | 39.22 | 5 | 11.98% | 25.89 | 198.52 |
| Hydrating Day Cream All Bright SPF 15 | 71.99 | 3 | 16.32% | 27.11 | 207.82 |
| Natural Mineral Water | 19.25 | 4 | 12.22% | 10.14 | 77.72 |
| Intercontinental Distilleries Ltd | 97.09 | 3 | 12.40% | 38.27 | 293.43 |
| Natural Nine Grain Bread | 42.04 | 4 | 1.03% | 24.97 | 191.40 |
| Rose Deep Cleansing Nose Strips | 14.59 | 3 | 11.69% | 5.80 | 44.46 |
| Pepper Mayonnaise | 8.18 | 5 | 19.92% | 4.91 | 37.64 |

720

INVOICE
Invoice Reference: 614871043
Purchase Order: 726824
Invoice Date: Apr 27 2277
Due Date: May 31 2277

| Total Due | Due Date |
|---|---|
| £528.12 | May 31 2277 |

Fred White & Co (Bristol) Ltd
140 Gloucester Rd
Bristol BS7 8AX

| Description | Cost | Qty | Discount | VAT | Amount |
|---|---|---|---|---|---|
| Surdegsbrödmix | 17.73 | 6 | 18.86% | 12.95 | 99.25 |
| Protein Plus Bar Cookies & Cream Flavour | 2.54 | 8 | 4.84% | 2.90 | 22.22 |
| Onion Rings | 48.91 | 3 | 10.99% | 18.59 | 150.21 |
| Diphenhydramine HCl 25mg/ antihistamine | 77.16 | 3 | 3.67% | 33.45 | 256.43 |

FIG. 7B

Invoice 710 (Bridge Interiors, 56 Bridge Ln, Ilkley LS29 9EU)

INVOICE
Invoice Reference: 237481709
Purchase Order: 855496
Invoice Date: Apr 14 95
Due Date: May 16 95

Total Due: £1901.68
Due Date: May 16 95

| Description | Cost | Qty | Discount | VAT | Amount |
|---|---|---|---|---|---|
| Energy Bar | 12.93 | 3 | 16.00% | 4.77 | 36.57 |
| 100% Juice Apple Grape | 47.15 | 3 | 4.99% | 20.16 | 154.54 |
| Five Cheese Tortelloni with Parmigiano Reggiano | 74.17 | 3 | 15.43% | 28.23 | 216.41 |
| Slimline CD Jewel Cases | 87.31 | 5 | 11.67% | 57.84 | 443.46 |
| Eye Makeup-up Remover Pads | 39.22 | 5 | 11.98% | 25.89 | 198.52 |
| Hydrating Day Cream All Bright SPF 15 | 71.99 | 3 | 16.32% | 27.11 | 207.82 |
| Natural Mineral Water | 19.25 | 4 | 12.22% | 10.14 | 77.72 |
| Intercontinental Distilleries Ltd | 97.09 | 3 | 12.40% | 38.27 | 293.43 |
| Natural Nine Grain Bread | 42.04 | 4 | 1.03% | 24.97 | 191.40 |
| Rose Deep Cleansing Nose Strips | 14.59 | 3 | 11.69% | 5.80 | 44.46 |
| Pepper Mayonnaise | 8.18 | 5 | 19.92% | 4.91 | 37.64 |

713

Invoice 720 (Fred White & Co (Bristol) Ltd, 140 Gloucester Rd, Bristol BS7 9AX)

INVOICE
Invoice Reference: 614971043
Purchase Order: 726824
Invoice Date: Apr 27 2277
Due Date: May 21 2277

Total Due: £520.12
Due Date: May 31 2277

| Description | Cost | Qty | Discount | VAT | Amount |
|---|---|---|---|---|---|
| Surdegsbrödmix | 17.73 | 6 | 18.86% | 12.95 | 99.25 |
| Protein Plus Bar Cookies & Cream Flavour | 2.54 | 8 | 4.84% | 2.90 | 22.22 |
| Onion Rings | 48.91 | 3 | 10.99% | 19.59 | 150.21 |
| Diphenhydramine HCl 25mg/ antihistamine | 77.16 | 3 | 3.67% | 33.45 | 256.43 |

INVOICE

Invoice Reference: 237481709
Purchase Order: 855496
Invoice Date: Apr 14 95
Due Date: May 16 95

Bridge Interiors
56 Bridge Ln
Ilkley LS29 9EU

816 —

| Total due | Due Date |
|---|---|
| £1901.98 | May 16 95 |

| Description | Cost | Qty | Discount | VAT | Amount |
|---|---|---|---|---|---|
| Energy Bar | 12.93 | 3 | 18.00% | 4.77 | 36.57 |
| 100% Juice Apple Grape | 47.15 | 3 | 4.99% | 20.16 | 154.54 |
| Five Cheese Tortelloni with Parmigiano Reggiano | 74.17 | 3 | 15.43% | 28.23 | 216.41 |
| Slimline CD Jewel Cases | 87.31 | 5 | 11.67% | 57.84 | 443.46 |
| Eye Makeup-up Remover Pads | 39.22 | 5 | 11.96% | 25.89 | 198.52 |
| Hydrating Day Cream All Bright SPF 15 | 71.99 | 3 | 16.32% | 27.11 | 207.82 |
| Natural Mineral Water | 19.25 | 4 | 12.22% | 10.14 | 77.72 |
| Intercontinental Distilleries Ltd | 97.09 | 3 | 12.40% | 36.27 | 293.43 |
| Natural Nine Grain Bread | 42.04 | 4 | 1.03% | 24.97 | 191.40 |
| Rose Deep Cleansing Nose Strips | 14.59 | 3 | 11.69% | 5.80 | 44.46 |
| Pepper Mayonnaise | 8.18 | 5 | 19.92% | 4.91 | 37.64 |

Subtotal £1872.45
Discount £218.56
VAT £248.08
Total due: £1901.98

Company ID: 549852
VAT No: 50510

Website: TODO.com
Telephone: 896-028-8629

FIG. 8(contd)
820

INVOICE

Invoice Reference: 614871043
Purchase Order: 726824
Invoice Date: Apr 27 2277
Due Date: May 31 2277

Fred White & Co (Bristol) Ltd
140 Gloucester Rd
Bristol BS7 8AX

| | Due Date |
|---|---|
| £528.12 | May 31 2277 |

~826

| Description | Cost | Qty | Discount | VAT | Amount |
|---|---|---|---|---|---|
| Surdegsbrödmix | 17.73 | 6 | 18.86% | 12.95 | 99.25 |
| Protein Plus Bar Cookies & Cream Flavour | 2.54 | 8 | 4.84% | 2.90 | 22.22 |
| Onion Rings | 48.91 | 3 | 10.99% | 19.59 | 150.21 |
| Diphenhydramine HCl 25mg/ anitihistamine | 77.16 | 3 | 3.67% | 33.45 | 256.43 |

| | |
|---|---|
| Subtotal | £504.89 |
| Discount: | £45.65 |
| VAT: | £68.89 |
| Total due: | £528.12 |

Company ID: 151007
VAT No: 20139

Website: TODO.com
Telephone: (+1)306-378-716

INVOICE

Invoice Reference: 881016404
Purchase Order: 719936
Invoice Date: Apr /04/1908
Due Date: Apr/15/1908

Ironwood Workshop
5 Heath Road
Twickenham TW1 4BZ

| Due | Due Date |
|---|---|
| £2085.58 | Apr/15/1908 |

— 836

| Description | Cost | Qty | Discount | VAT | Amount |
|---|---|---|---|---|---|
| Wintergreen | 52.15 | 3 | 13.88% | 20.20 | 154.90 |
| Can I have a Hug? | 7.71 | 3 | 12.29% | 3.04 | 23.33 |
| merdas | 12.73 | 3 | 18.25% | 4.68 | 35.91 |
| Peanut Butter & Fudge Filled Pretzel Bites | 89.54 | 4 | 5.12% | 50.98 | 390.81 |
| Colgate | 16.48 | 6 | 10.47% | 13.28 | 101.78 |
| Original Coffee Creamer | 16.17 | 3 | 16.54% | 6.07 | 46.55 |
| Baby Genius - For Seasons | 60.34 | 3 | 5.95% | 25.54 | 195.78 |
| Dark Chocolate Fudge Brownie Mix | 45.67 | 3 | 9.58% | 18.58 | 142.48 |
| Lieler Schlossbrunnen still perlend | 53.56 | 3 | 2.31% | 23.54 | 180.50 |
| Zone Perfect Double Dark Chocolate (Single Bar) | 32.57 | 3 | 11.31% | 13.00 | 99.65 |
| RAINSUFR74 | 3.71 | 3 | 17.06% | 1.39 | 10.62 |
| Lucerne Large Grade AA Eggs | 35.86 | 5 | 15.58% | 22.70 | 174.07 |
| Creatine Monohydrate 1000 mg | 61.19 | 5 | 1.18% | 45.35 | 347.68 |
| Divine Wellness World Ltd | 62.20 | 3 | 15.41% | 23.68 | 181.52 |

Subtotal £504.89
Discount: £45.65
VAT: £68.89
Total due: £528.12

Company ID: 151007
VAT No: 20139

Website: TODO.com
Telephone: (+1)306-378-716

METHODS AND SYSTEMS FOR PERFORMING DATA CAPTURE

FIELD OF THE DISCLOSURE

The present disclosure relates to methods and system for performing data capture. More specifically, the present disclosure relates to systems and computer-implemented methods for performing data capture in one or more unlabelled documents based on one or more labelled documents.

BACKGROUND

Various types of documents are widely used for collecting and recording information for a number of purposes and fields, such as medical, commercial, educational, and governmental, etc. Due to the widespread use of computers and communication networks nowadays, these documents are now typically created and provided electronically so that they can be generated and shared digitally. These documents usually contain data in structured or semi-structured formats. Structured documents can have embedded code which enables the information to be arranged in a specified format. Semi-structured documents may be documents such as invoices, bank statements, utility bills, passports, etc. that do not follow a strict layout the way structured documents do, and they are not bound to specified data fields like structured documents.

In order to utilise information from these electronic documents to perform desired operations (e.g. enterprise-related operations), the information needs to be properly extracted. However, at least for semi-structured electronic documents, it may be difficult to reliably parse and extract the needed information as these documents often do not have well-defined layouts.

SUMMARY

Data capture is the task of extracting relevant information from documents. The One-Shot Data Capture (OSDC) technique described in the present disclosure is designed to extract information from structured and semi-structured documents. The data to be captured may include values of key-value pairs in the documents, e.g. invoice number, total amount, and/or values that are in tables in the documents. In the context of the present disclosure, key-value pairs may be referred to as "field-element pairs", where keys may be referred to as "fields" and values may be referred to as "elements". In its simplest form, the OSDC technique can work on a pair of documents: one labelled and one unlabelled. The task in this case is to extract the same type of information from the unlabelled document as that labelled in the labelled document.

Embodiments described herein are directed towards methods and systems for performing data capture in an unlabelled document based on a labelled document.

According to an aspect of the present disclosure, there is provided a computer-implemented method for performing data capture in an unlabelled document based on a labelled document, wherein the labelled document contains one or more elements each labelled with respect to a field. The method comprises: determining one or more anchors, wherein an anchor comprises a pair of points that match between the labelled document and the unlabelled document; generating an overall kernel using the determined one or more anchors; and identifying, using the overall kernel in a kernel machine, one or more elements to be captured in the unlabelled document, wherein the one or more elements to be captured correspond in field to the one or more labelled elements contained in the labelled document.

According to another aspect of the present disclosure, there is provided a system for performing data capture in an unlabelled document based on a labelled document, wherein the labelled document contains one or more elements each labelled with respect to a field. The system comprises: a determining unit configured to determine one or more anchors, wherein an anchor comprises a pair of corresponding points that match between the labelled document and the unlabelled document; a generating unit configured to generate an overall kernel using the determined one or more anchors; and an identifying unit configured to identify, using the overall kernel in a kernel machine, one or more elements to be captured in the unlabelled document that contain information to be captured, wherein the one or more elements to be captured corresponds in field to the one or more labelled elements contained in the labelled document.

According to another aspect of the present disclosure, there is provided a computer-readable storage medium comprising instructions which, when executed by a computer, cause the computer the carry out the steps of the method as described in the present disclosure.

Optional features are set out in appended dependent claims.

These, and other, aspects of the present disclosure will be better appreciated and understood when considered in conjunction with the following description and the accompanying drawings. The following description, while indicating various embodiments of the disclosure and numerous specific details thereof, is given by way of illustration and not of limitation. Many substitutions, modifications, additions or rearrangements may be made within the scope of the disclosure, and the disclosure includes all such substitutions, modifications, additions or rearrangements.

BRIEF DESCRIPTION OF THE DRAWINGS

Embodiments of the present disclosure will now be described, by way of example only, with reference to the accompanying drawings, in which:

FIG. 3A is a diagram illustrating an exemplary labelled document and an exemplary unlabelled document, according to an embodiment of the present disclosure;

FIG. 3B is a diagram illustrating an exemplary labelled document and an exemplary unlabelled document, according to an embodiment of the present disclosure;

FIG. 5 is a diagram illustrating an anchor determined from the exemplary process shown in FIG. 4;

FIG. 6 is a diagram illustrating an exemplary labelled document and an exemplary unlabelled, according to an embodiment of the present disclosure;

FIG. 7A is a diagram illustrating an anchor determined based on the labelled document and the unlabelled document of FIG. 6;

FIG. 7B is a diagram illustrating another anchor determined based on the labelled document and the unlabelled document of FIG. 6;

FIG. 8 is a diagram illustrating anchors determined from the documents of FIG. 6 and another unlabelled document.

DETAILED DESCRIPTION

In the following description, numerous specific details are set forth in order to provide a thorough understanding of the embodiments. It will be apparent, however, to one having ordinary skill in the art the specific detail need not be employed to practice the embodiments. In other examples, well-known materials or methods have not been described in detail in order to avoid obscuring the present disclosure.

Figure 1:
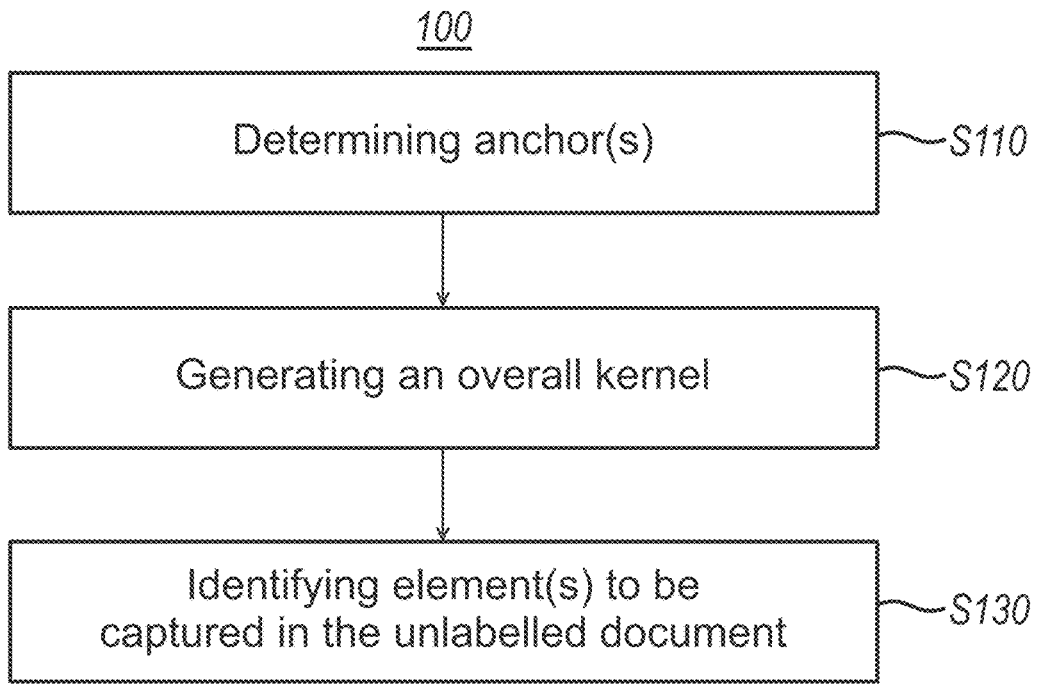
FIG. 1 is a flowchart of a computer-implemented method for performing data capture, according to an embodiment of the present disclosure.
Figure 9:
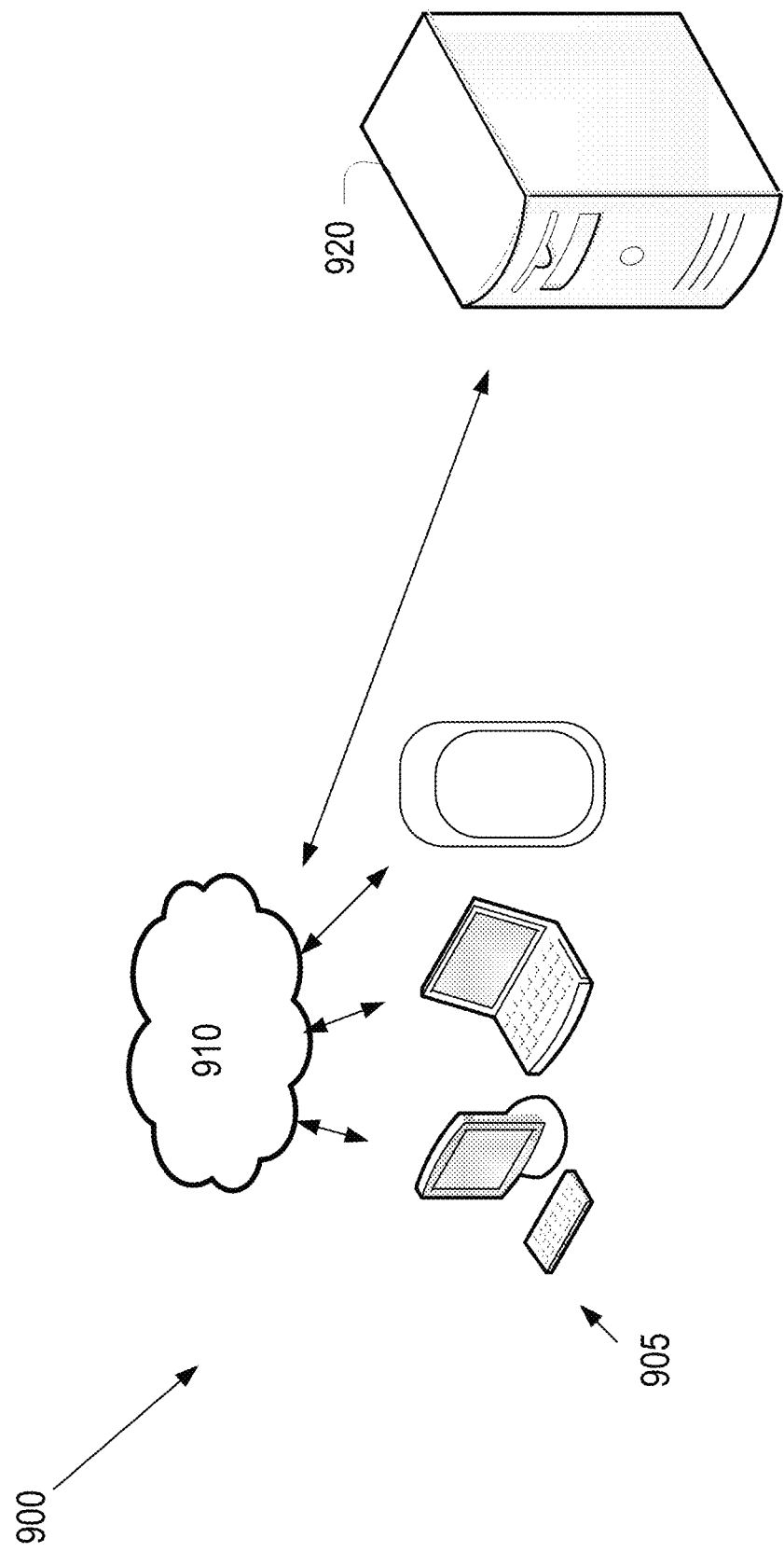
FIG. 9 is a diagram illustrating a topology for performing data capture, according to an embodiment of the present disclosure.

FIG. 1 is a flowchart of a computer-implemented method 100 for performing data capture, according to an embodiment of the present disclosure. In more detail, the illustrated method 100 is for performing data capture in an unlabelled document based on a labelled document. The labelled document contains one or more elements each labelled with respect to a field. Each element may be represented by a word, a string of words, or a number, or a combination thereof. In some embodiments, the labelled document may further comprise the one or more fields indicated by the one or more labels. The labelled document and/or the unlabelled document may be a PDF document or an image. In some implementations, the method may be performed by a client computing device, a network, a server, or a combination thereof, such as the client computer device 905, the network 910, and the server 920 as illustrated in FIG. 9.

The method 100 begins at step S110 at which one or more anchors are determined. An anchor comprises a pair of points that match between the labelled document and the unlabelled document. In some implementations, a new set of one or more anchors is determined for each new pair of documents (where the pair includes an unlabelled document and a labelled document).

In some embodiments, determining an anchor at step S110 may comprise receiving a user input selecting the pair of points in the unlabelled document and the labelled document. Alternatively, in some embodiments, determining an anchor at step S110 may comprise the following steps:

extracting all the words in the labelled document and the unlabelled document (e.g. using OCR);

generating a first linear text sequence by ordering words contained in the labelled document into a linear text sequence (and optionally, removing any word that corresponds to a labelled element);

generating a second linear text sequence by ordering words contained in the unlabelled document into a linear text sequence;

identifying a match between the first and second linear text sequences (if words that correspond to labelled elements have not been removed at this stage, these words are ignored in the step of match identification); and designating the matched words as the anchor.

A match in this context involves the inherent similarity of the two words, as well as their alignment (i.e. the similarity in terms of a linear order of a respective word in the respective sequence). In these embodiments, a match between the first and second linear text sequence may be one that exceeds predetermined thresholds in terms of both inherent similarity (e.g. visual features) and an alignment (i.e. how similar they are in terms of their respective linear orders in respective text sequences). In other words, a match may be two words that look the same or similar and that have the same or similar linear order in the respective text sequence. As an example of visual similarity, the words "barn" and "barn" can be determined to exceed a predetermined visual similarity threshold due to their visual similarities (e.g. where the threshold takes into account of Optical Character Recognition (OCR) errors such as "m" and "rn"). As an example of alignment, the 8th word in a first text subsequence would have a higher degree of alignment with the 8th word in a second text sequence than with the 7th word in the sequence text sequence. In some embodiments, the identification of a match (more specifically, the determination of whether two words exceeds an alignment threshold) may be based on an alignment algorithm, such as an algorithm similar to or equivalent to the Needleman-Wunsch algorithm.

Alternatively or additionally, in these embodiments ordering words contained in the labelled and unlabelled documents may be performed using a reading order algorithm (i.e. any algorithm that attempts to order the words as a human would read them).

Alternatively or additionally, in these embodiments each of the one or more anchors may be defined as the correspondence between the centre of the respective matched word in the labelled document and the centre of the respective matched word in the unlabelled document.

In some embodiments, determining an anchor at step S110 may comprise identifying a visual feature that is present in both the labelled document and the unlabelled document (e.g. using an image alignment algorithm), and designating the identified visual feature as the anchor. The image alignment algorithm may be one that is based on at least one of: a keypoint detector (e.g. Difference-of-Gaussian, Harris, Good Features to Track (GFTT), a local invariant descriptor (e.g. Scale-Invariant Feature Transform (SIFT), Speeded Up Robust Features (SURF), and Oriented FAST and Rotated BRIEF (ORB), etc.), and a keypoint matching process (e.g. RANdom Sample Consensus (RANSAC)).

In some embodiments, determining an anchor at step S110 may comprise placing a plurality of points around the boundary of the unlabelled document and a same number of points around the boundary of the labelled document, identifying a match between a point in the labelled document and a point in the unlabelled document, and designating the matched points as the anchor.

Although it is described in the present embodiment that one or more anchor(s) are determined for a pair of documents (i.e. the labelled and unlabelled documents), it will be appreciated that the processes described above for determining an anchor can be applied to more than two documents (e.g. multiple labelled documents and/or multiple unlabelled documents). For example, an anchor may comprise multiple points that match (i.e. exceed a visual similarity threshold and an alignment threshold), each of the multiple points being in a different document.

Also, although it is described in the present embodiment that anchors can comprise matched single words (which may or may not consist of or include numbers), in other embodiments an anchor can comprise matched terms in addition to or instead of words, e.g. the words "total amount" being processed as a single term rather than two separate words, thus the respective anchor corresponding to the term "total amount" matching in the pair of documents.

Returning to FIG. 1, at step S120, an overall kernel is generated using the determined one or more anchors. In some embodiments, generating the overall kernel at step S120 may comprise generating a convolution kernel for each of the one or more anchors determined at step S110, and generating the overall kernel by summing the one or more convolution kernels. The overall kernel may be a weighted sum of the one or more convolution kernels.

Each convolution kernel may range over all pairs of words within and between the labelled document and the unlabelled document. In other embodiments where there are more than two documents in which data capture is performed, each convolution kernel may range over all pairs of words within and across all of the two or more documents. Each convolution kernel may measure the similarity of words within and between the labelled document and the unlabelled document (or across all documents where more than two documents are involved), the similarity being a function of a distance of the respective word from the respective point of the anchor and a similarity in relative location with respect to the respective point of the anchor.

To explain convolution kernels in more technical detail, we define a document, d, as a sequence of words, $w_d = w_{d,1}, \ldots, w_{d,n_d}$, where $n_d$ is the number of words in the document.

If the document is labelled, there may also be provided labels for each word, $l_d = l_1, \ldots, l_{n_d}$, where the labels can belong to any of K categories (each category corresponding to a field):

$$l_i \in \{1, \ldots, K\}, 1 \leq i \leq n_d$$

Furthermore, each word may have a location on the page of the document. The location of the i'th word in the d'th document, $w_{d,i}$, is designated as $x_{d,i}$.

An anchor, a, across two documents, $d_1$ and $d_2$, may be represented by a pair of locations, one in each document, $a = (a_1, a_2)$, where $a_1$ is a location in $d_1$ and $a_2$ is a location in $d_2$. The labelled document may be defined as $d = d_1$ and the unlabelled document may be defined as $d = d_2$.

A convolution kernel, k, that operates on pairs of words, $(w_{d,i}, w_{d',j})$, can be defined with respect to an anchor, a, as the product of other radial basis function (RBF) kernels, $k_{off}$ and $k_{rel}$. The key inputs to the kernels are the relative positions of the words to the anchor, defined as:

$$z = w_{d,i} - a_d$$

$$z' = w_{d',j} - a_{d'},$$

The kernels can be defined as:

$$k(w_{d,i}, w_{d',j}; a) = k_{off}(z) k_{off}(z') k_{rel}(z, z')$$

$$k_{off}(z) = k_{RBF}(\|z A_{off}\|_2)$$

$$k_{rel}(z, z') = k_{RBF}(\|(z - z') A_{rel}\|_2)$$

$$k_{RBF}(r) = e^{-\frac{r^2}{2}}$$

In the above equations, r is a distance (i.e. the L2-norm of a vector $\|(x-x')\|$).

Since the convolution kernel can act on any pair of words regardless of whether they are in the same document or not, it is noted that it is possible for d=d' or d≠d'.

The linear transformations (matrices), $A_{off}$ and $A_{rel}$, act as inverse length-scales. In one implementation, these are parameterised diagonally, where σ is a length-scale:

$$A_{off} = \begin{pmatrix} \frac{1}{\sigma_{x,off}} & 0 \\ 0 & \frac{1}{\sigma_{y,off}} \end{pmatrix}$$

$$A_{rel} = \begin{pmatrix} \frac{1}{\sigma_{x,rel}} & 0 \\ 0 & \frac{1}{\sigma_{y,rel}} \end{pmatrix}$$

This allows the kernels to have different influences in each direction in the document. For example, the value of a can be set such that the influence for width is more accommodating than the influence for height in the document.

The reasoning for the above kernel equations is that the offset kernel, k off, decays as the words are further from the anchor. That is, the anchor only has a local effect. In contrast, the relative kernel, $k_{rel}$, quantifies the similarity between the spatial relationships between the anchor and each word. That is, words are similar when they are positioned in the same location relative to the anchor. The product of the kernels can be taken so that words are only considered similar when they are both close to the anchor and their position relative to the anchor is similar.

Although it is described above that each convolution kernel may range over pairs of words, in alternative embodiments convolution kernels may each range over pairs of terms (e.g. each term consisting multiple words) instead of, or in addition to, pairs of single words.

As mentioned above, in some embodiments the process for determining an anchor can be applied to more than two documents (e.g. more than one labelled document and an unlabelled document), where each anchor may comprise multiple points that match, each of them multiple points being in a different document. In these embodiments, an anchor may be defined as $a = (a_1, a_2, \ldots, a_N)$, where N−1 is the number of labelled documents that have been selected for data capture (thus N being the total number of documents). Furthermore, in these embodiments, each convolution kernel may range over all pairs of words within and across all documents, and the overall kernel is the sum of all convolution kernels. This larger overall kernel (when compared to situations where only two documents are used) may provide more information to the kernel machine at step S130 for identifying one or more elements to be captured. Each convolution kernel defined with respect to a set of documents can be represented as a symmetric positive semi-definite matrix having dimensions that correspond to the number of words in all of the documents in the respective set of documents. Therefore, in this case, each matrix entry in the matrix corresponds to a respective similarity between a particular pair of words amongst the words in the documents in the set of the documents. Similarly, since the overall kernel is generated by summing the convolution kernels, it can also be represented as a symmetric positive semi-definite matrix, where each matrix entry in the matrix corresponds to a respective similarity between a particular pair of words amongst the words in the documents in the set of the documents.

Returning to FIG. 1, at step S130, one or more elements to be captured in the unlabelled document are identified using the overall kernel in a kernel machine. The one or more elements to be captured correspond in field to the one or more labelled elements contained in the labelled document. The kernel machine may comprise at least one of: a Support-vector machine (SVM), Regularized Kernel Discriminant Analysis (RKDA), and Gaussian process (GP). The kernel machine may be trained based on at least one of the one or more elements and the one or more fields as indicated by respective label(s) in the labelled document. In some cases, the kernel machine may be trained based on all of the one or more elements and one or more fields as indicated by respective label(s) in the labelled document, in order to maximise the number of samples used for training. In some embodiments, the kernel machine may be trained using a subset of matrix entries for the overall kernel, wherein each matrix entry in the subset of matrix entries for the overall kernel corresponds to a pair of words within the labelled document. The identified element(s) may be ones that correspond to words that have a high (predicted) similarity/confidence score as determined by the kernel machine. In these embodiments, the method may further comprise outputting the similarity/confidence score(s) as determined by the kernel machine.

Although not shown in FIG. 1, in some embodiments the method 100 may further comprise, subsequent to identifying the one or more elements at step S130, at least one of receiving a user input confirming or rejecting results of the identification and receiving a user input modifying results of the identification. In these embodiments, if a user input confirming the results is received, the method 100 may further comprise outputting the results (e.g. via a display), or to perform further processing of the results (e.g. field determination and/or grouping, in the manner as described below). If a user input modifying results of the identification is received, the method 100 may further comprise performing the modifications based on the user input and/or storing the modified results as at least part of a new labelled document.

In some embodiments, the method may further comprise determining, for each of the identified one or more elements, a field to which the respective element corresponds. This determination operation may also be performed using the overall kernel in the kernel machine. It will be appreciated that in some embodiments the operation of identifying one or more elements at step S130 and the operation of determining a field for each of the identified one or more elements may be performed simultaneously as a single step/process in the kernel machine.

In some embodiments where there are a plurality of identified elements, the operation of field determination for the identified elements may comprise grouping the plurality of identified elements into one or more groups, where each group corresponds to a field. This grouping may be based on a word grouping algorithm. More specifically, grouping the plurality of identified elements may comprise:
  generating a linear text sequence of the plurality of identified elements in the unlabelled document (e.g. by their reading order using a reading order algorithm);
  determining the classification of each element in the generated linear text sequence (e.g. using the kernel machine); and
  grouping every maximal contiguous subsequence of elements in the generated linear text sequence that share a classification into a respective group.

The classification determined for each element may be an argmax classification. Determining the classification may be based on a plurality of possible classifications, where each possible classification corresponds to a field in the labelled document or corresponds to an indication that the element is not associated with any field in the labelled document.

In embodiments where the plurality of identified elements are grouped (e.g. using the grouping algorithm as described above), the method may further comprise assigning a respective row identifier to each element in a group based on a relative order of the element in the group. This allows elements that belong to a table format to be outputted as such (i.e. elements having the same row identifier being placed in the same row).

In some embodiments, the one or more fields and one or more elements in the labelled document may be presented in an information structure. For example, in an invoice the one or more fields may be presented in the header of a table and the one or more elements may be presented under the header of the table, each column corresponding to a field and each row corresponding to a purchased item. In these embodiments, the method 100 may further comprise outputting the identified one or more elements and their corresponding fields in the same (or similar) information structure. Alternatively, the method 100 may further comprise outputting only the one or more elements (regardless of whether the field(s) and/or element(s) are presented in a same/similar or different information structure).

The method may further comprise assigning a new label to each of the identified one or more elements to indicate a field to which the respective element corresponds.

In some embodiments, the method may further comprise placing each of the one or more identified elements into a normalised form. For example, any elements that correspond to date information may be returned in the format of DD/MM/YYYY. This operation may be based on a field-agnostic rule (i.e. one rule for all fields), such as a rule to remove any preceding or trailing punctuation symbol in a respective string of text of the identified element. Alternatively, the operation can be based one or more field specific rules, where the field specific rule(s) may be based on metadata of the labels in the labelled document.

It will be appreciated that in some embodiments the use of label(s) in the labelled document is sufficient in indicating which element(s) are ones that are of interest, and thus also which corresponding element(s) in the unlabelled document should be identified and captured. Nevertheless, in some embodiments the method may further comprise, prior to determining one or more anchors at step S110, acquiring a schema that defines the one or more fields contained in the labelled document and whether elements corresponding to each field in the labelled document are presented in a table. The schema can provide more explicit information on what data should be captured from the unlabelled document. This schema can be used, for example, in the determination of anchors at S110 of the method 100 such that the one or more fields defined by the schema can each be used as a point of an anchor.

Although not shown in FIG. 1, in some embodiments the method 100 may further comprise, prior to determining one or more anchors at step S110, receiving user input assigning the one or more labels to the elements of the labelled document. In some implementations, receiving the user input assigning a label may comprise: receiving a user selection of a field in labelled document, and receiving one or more user selections of one or more elements corresponding to the selected field. As an example, the user selection of an element may be implemented by allowing the user to draw a rectangular box around the element on the document, for example via a user interface such as a touchscreen. The field corresponding to a label (which can be represented by a rectangular box) can be indicated by way of a visual indicator. For example, each rectangular box may have a colour that indicates the corresponding field of the element. In this case, the rectangular boxes for elements corresponding to the same first field would have the same first colour, and the rectangular boxes elements corresponding to the same second field have the same second colour, so on and so forth. Moreover, in some embodiments, each label may contain metadata. For example, this may be metadata for indicating whether the field is in the form of a number and/or metadata for indicating whether elements corresponding to a field are presented in a table format, etc.

In some embodiments, the method 100 may further comprise, prior to determining one or more anchors, acquiring a plurality of candidate labelled documents and receiving a user input selecting the labelled document from the plurality of candidate labelled documents. Alternatively, the method 100 may further comprise, prior to determining one or more anchors, acquiring a plurality of candidate labelled documents and determining the labelled document from the acquired candidate labelled documents based on a similarity metric between each of the plurality of candidate labelled documents and the unlabelled document. In some embodiments determining the labelled document from a plurality of candidate labelled documents may be based on a similarity function and a best match algorithm. The similarity function may be a function that can process a pair of documents (i.e. the respective candidate labelled document and the unlabelled document in this case) and return a similarity metric based on the processing. An example of a similarity metric may be a score that indicates the degree of similarity of the two documents.

In some embodiments, the similarity function may be based on a bag-of-words model which compares the pair of documents by the number of common words across the documents (which may or may not include duplicate words). For example, if a document consists of a plurality of tokens "a a a b c" and another document consists of a plurality of tokens "a a c c d", the similarity function may return a similarity score of 3, since the pair of documents share three tokens—two 'a's and a 'c'.

Once all the similarity scores between all pairs of the candidate labelled documents and the unlabelled document have been determined in this manner, the best match algorithm can then be used to select the "best match" based on the similarity metrics between each of the plurality of candidate labelled documents and the unlabelled document. For example, the best match algorithm can be used to select the pair of documents that has the highest similarity score.

In some cases, a similarity score threshold may be used to determine that none of the plurality of candidate labelled documents is suitable for performing data capture according to the method described herein. For example, if the similarity score threshold is set as 4 and if none of the similarity scores of the pairs of documents (each pair containing a candidate labelled document and the unlabelled document) is equal to or exceeds 4, then the method may further comprise providing an output to indicate that none of the (current) candidate labelled documents can be used for data capture. The method may also further comprise acquiring a new set of plurality of candidate labelled documents and determining the labelled document based on a similarity metric between each of the plurality of new candidate labelled documents and the unlabelled document.

Alternatively, or in addition, in some cases a similarity score threshold may be used to determine that multiple candidate labelled documents is suitable for performing data capture according to the method described herein. For example, if the similarity score threshold is set as 4 and if more than one pair of documents (each pair containing a candidate labelled document and the unlabelled document) has a similarity score that is equal to or exceeds 4, then the step of determining an anchor at step S110 may be based on multiple labelled documents (each of which corresponds to a similarity score higher than the threshold) and the unlabelled document. As mentioned above, in this case, each anchor may comprise multiple points that match, each of the multiple points being in a different document. Moreover, in this case the step of generating the overall kernel at step S120 may be based on the multiple labelled documents and the unlabelled document. In other words, each convolution kernel may range across the plurality of labelled documents (each of which corresponds to a similarity score higher than the threshold) and the unlabelled document.

Figure 2:
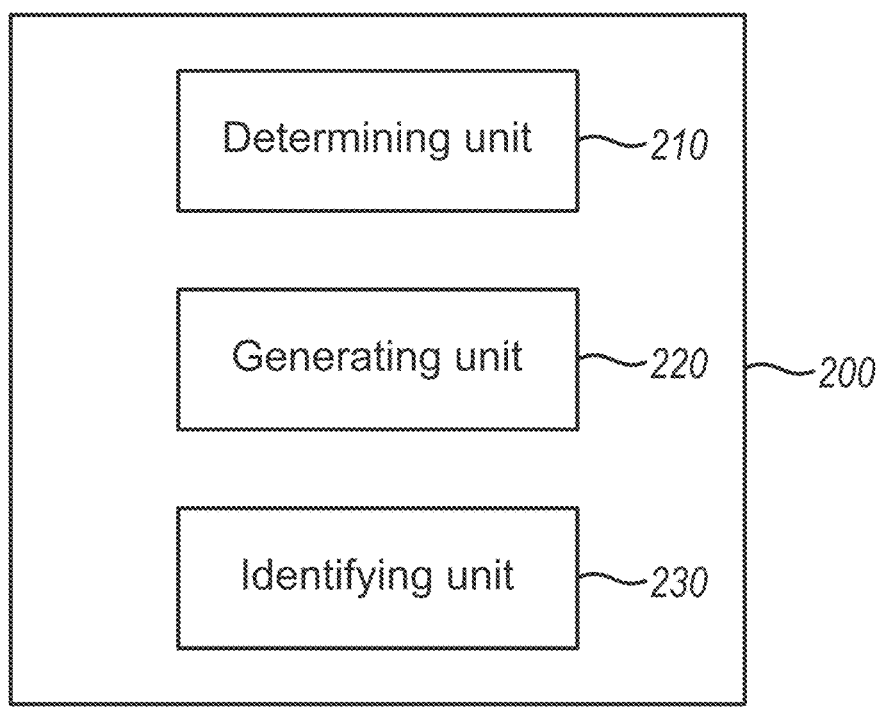
FIG. 2 is a block diagram of a system for performing data capture, according to an embodiment of the present disclosure.

FIG. 2 is a block diagram of a system for performing data capture, according to an embodiment of the present disclosure. In more detail, the system 200 is for performing data capture in an unlabelled document based on a labelled document. The labelled document contains one or more elements each labelled with respect to a field. Each element may be represented by a word, a string of words, or a number, or a combination thereof. In some embodiments, the labelled document may further comprise the one or more fields indicated by the one or more labels. The labelled document and/or the unlabelled document may be a PDF document or an image.

As shown in FIG. 2, the system 200 comprises a determining unit 210, a generating unit 220, and an identifying unit 230. The determining unit 210 is configured to determine one or more anchors. As mentioned above, an anchor comprises a pair of points that match between the labelled document and the unlabelled document. In some implementations, the determining unit 210 may be configured to determine a new set of one or more anchors for each new pair of documents (where the pair includes an unlabelled document and a labelled document).

In some embodiments, the determining unit 210 may be configured to determine an anchor by receiving a user input selecting the pair of points in the unlabelled document and the labelled document. Alternatively, in some embodiments, the determining unit 210 may be configured to determine an anchor by:

extracting all the words in the labelled document and the unlabelled document (e.g. using OCR);

generating a first linear text sequence by ordering words contained in the labelled document into a linear text sequence (and optionally, removing any word that corresponds to a labelled element);

generating a second linear text sequence by ordering words contained in the unlabelled document into a linear text sequence;

identifying a match between the first and second linear text sequences (if words that correspond to labelled elements have not been removed at this stage, these words are ignored in the step of match identification); and designating the matched words as the anchor.

A match in the present context involves the inherent similarity of the two words (e.g. visually), as well as the similarity or match in terms of a linear order of a respective word in the respective sequence. In these embodiments, a match between the first and second linear text sequence may be one that exceeds predetermined threshold(s) in terms of both inherent similarity and an alignment similarity. Moreover, the determining unit 210 may be configured to identify the match (more specifically, determine whether two words exceeds an alignment similarity threshold) based on an alignment algorithm (e.g. an algorithm similar to or equivalent to the Needleman-Wunsch algorithm).

In these embodiments, the determining unit 210 may be configured to order words contained in the labelled and unlabelled documents using a reading order algorithm. Furthermore, in these embodiments each of the one or more anchors may be defined as the correspondence between the centre of the respective matched word in the labelled document and the centre of the respective matched word in the unlabelled document.

In some embodiments, the determining unit 210 may be configured to determine an anchor by identifying a visual feature that is present in both the labelled document and the unlabelled document (e.g. using an image alignment algorithm), and designating the identified visual feature as the anchor. The image alignment algorithm may be one that is based on at least one of: a keypoint detector (e.g. Difference-of-Gaussian, Harris, Good Features to Track (GFTT), a local invariant descriptor (e.g. Scale-Invariant Feature Transform (SIFT), Speeded Up Robust Features (SURF), and Oriented FAST and Rotated BRIEF (ORB), etc.), and a keypoint matching process (e.g. RANdom Sample Consensus (RANSAC)).

In some embodiments, the determining unit 210 may be configured to determine an anchor by placing a plurality of points around the boundary of the unlabelled document and a same number of points around the boundary of the labelled document, identifying a match between a point in the labelled document and a point in the unlabelled document, and designating the matched points as the anchor.

Although it is described in the present embodiment that one or more anchor(s) are determined for a pair of documents (i.e. the labelled and unlabelled documents), it will be appreciated that the processes described above for determining an anchor by the determining unit 210 can be applied to more than two documents (e.g. multiple labelled documents and/or multiple unlabelled documents). Also, although it is described in the present embodiment that anchors can comprise matched single words, in other embodiments an anchor can comprise matched terms instead of words, e.g. the words "total amount" being processed as a single term rather than two separate words.

The generating unit 220 is configured to generate an overall kernel using the determined one or more anchors. In some embodiments, the generating unit 210 may be configured to generate the overall kernel by: generating a convolution kernel for each of the one or more anchors, and generating the overall kernel by summing the one or more convolution kernels. The overall kernel may be a weighted sum of the one or more convolution kernels.

Each convolution kernel may range over all pairs of words within and between the labelled document and the unlabelled document. In some embodiments where there are more than two documents on which data capture is based, each convolution kernel may range over all pairs of words within and across all documents). Each convolution kernel may measure the similarity of words within and between the labelled document and the unlabelled document (or across all documents where more than two documents are involved), the similarity being a function of a distance of the respective word from the respective point of the anchor and a similarity in relative location with respect to the respective point of the anchor. The mathematical details of the convolution kernel are provided above with reference to FIG. 1, thus for the sake of brevity they will not be repeated here—it will be appreciated that these mathematical equations are applicable to the present embodiment. Also, as explained above with reference to FIG. 1, the convolution kernels and the overall kernel defined with respect to a set of documents can each be represented as a symmetric positive semi-definite matrix having dimensions that correspond to the number of words in all of the documents in the set of documents, and each matrix entry in a matrix corresponds to a respective similarity between a particular pair of words amongst the words in the documents in the set of the documents.

Although it is described above that each convolution kernel may range over pairs of words, in alternative embodiments convolution kernels may each range over pairs of terms (e.g. comprised of multiple words) instead of or in addition to pairs of single words.

The identifying unit 230 is configured to identify one or more elements to be captured in the unlabelled document, using the overall kernel in a kernel machine. The one or more elements to be captured correspond in field to the one or more labelled elements contained in the labelled document. The kernel machine may comprise at least one of: a Support-vector machine (SVM), Regularized Kernel Discriminant Analysis (RKDA), and Gaussian process (GP). The kernel machine may be trained based on the one or more elements and the one or more fields as indicated by respective label(s) in the labelled document. In some cases, the kernel machine may be trained based on all of the one or more elements and one or more fields as indicated by respective label(s) in the labelled document, in order to maximise the number of samples used for training. In some embodiments, the kernel machine may be trained using a subset of matrix entries for the overall kernel, wherein each matrix entry in the subset of matrix entries for the overall kernel corresponds to a pair of words within the labelled document. The identified element(s) may be ones that correspond to words that have a high (predicted) similarity/confidence score as determined by the kernel machine. In these embodiments, the system 200 may comprise an outputting unit configured to output the similarity/confidence score(s) as determined by the kernel machine.

Although not shown in FIG. 2, in some embodiments the system 200 may further comprise a receiving unit that is configured to, subsequent to the identifying unit 230 identifying the one or more elements, receive at least one of a user input confirming or rejecting results of the identification and a user input modifying results of the identification. Furthermore, the system 200 may comprise an outputting unit that is configured to output the results (e.g. via a display) if a user input confirming the results is received, and/or a performing unit configured to perform further processing of the results (e.g. field determination and/or grouping, thus the performing unit may be a determining unit). If a user input modifying results of the identification is received, the performing unit may be configured to perform the modifications based on the user input and/or a storing unit in the system 200 may be configured to store the modified results as at least part of a new labelled document.

In some embodiments, the determining unit 210 may be further configured to determine, for each of the identified one or more elements, a field to which the respective element corresponds. This determination may be performed using the overall kernel in a kernel machine, such as the kernel machine used by the identifying unit 230 for identifying the element(s). It will be appreciated that in some embodiments the determining unit 210 may be configured to perform identification of the one or more elements and field determination for each of the identified one or more elements simultaneously as a single step/process in the kernel machine.

Although not shown in FIG. 2, in some embodiments where there are a plurality of identified elements, the determining unit 210 may be configured to determine field(s) for the identified elements by grouping the plurality of identified elements into one or more groups. In these embodiments, each group may correspond to a field. The grouping may be based on a word grouping algorithm. More specifically, the determining unit 210 may be configured to group the plurality of identified elements by:

generating a linear text sequence of the plurality of identified elements in the unlabelled document;

determining the classification of each element in the generated linear text sequence (e.g. using the kernel machine); and grouping every maximal contiguous subsequence of elements in the generated linear text sequence that share a classification into a respective group.

The classification determined for each element may be an argmax classification. Determining of the classification by the determining unit 210 may be based on a plurality of possible classifications, where each possible classification corresponds to a field in the labelled document or corresponds to an indication that the element is not associated with any field in the labelled document.

Furthermore, in these embodiments the system 200 may further comprise an assigning unit configured to assign a respective row identifier to each element in a group based on a relative order of the element in the group.

In some embodiments, the one or more fields and one or more elements in the labelled document may be presented in an information structure. In these embodiments, the system 200 may further comprise an outputting unit configured to output the identified one or more elements and their corresponding fields in the same (or similar) information structure. Alternatively, the outputting unit may be configured to output only the one or more elements (regardless of whether the field(s) and/or element(s) are presented in a same/similar or different information structure).

The system 200 may further comprise an assigning unit configured to assign a new label to each of the identified one or more elements to indicate a field to which the respective element corresponds.

In some embodiments, the determining unit 210 may further configured to place each of the one or more identified elements into a normalised form. This operation may be based on a field-agnostic rule or based on one or more field specific rules.

It will be appreciated that in some embodiments the use of label(s) in the labelled document is sufficient in indicating which element(s) are ones that are of interest, and thus also which corresponding element(s) in the unlabelled document should be identified and captured. Nevertheless, in some embodiments the method may further comprise an acquiring unit that is configured to acquire, prior to the determining unit 210 determining one or more anchors, a schema that defines the one or more fields contained in the labelled document and whether elements corresponding to each field in the labelled document are presented in a table. The schema can provide more explicit information on what data should be captured from the unlabelled document. This schema can be used, for example, by the determining unit 210 in its determination of anchors such that the one or more fields defined by the schema can each be used as a point of an anchor.

In some embodiment, the system 200 may further comprise a receiving unit that is configured to receive user input assigning the one or more labels to the elements of the labelled document, prior to the determining unit 210 determining one or more anchors. In some implementations, the receiving unit may be configured to receive the user input assigning a label by: receiving a user selection of a field in labelled document and receiving one or more user selections of one or more elements corresponding to the selected field. As an example, the user selection of an element may be implemented by allowing the user to draw a rectangular box around the element on the document, for example via a user interface. The field corresponding to a label (which can be represented by a rectangular box) can be indicated by way of a visual indicator. For example, each rectangular box may have a colour that indicates the corresponding field of the element. Moreover, in some embodiments, each label may contain metadata (e.g. metadata to indicate whether the field is in the form of a number, metadata to indicate whether elements corresponding to a field is in a table format, etc.).

In some embodiments, the system 200 may further comprise an acquiring unit that is configured to acquire a plurality of candidate labelled documents. In these embodiments, the system 200 may further comprise a receiving unit configured to receive user input selecting the labelled document from the plurality of candidate labelled documents. Alternatively, in these embodiments, the determining unit 210 may be further configured to determine the labelled document from the acquired candidate labelled documents based on a similarity metric between each of the plurality of candidate labelled documents and the unlabelled document. More specifically, the determining unit 210 may be configured to determine the labelled document based on a similarity function and a best match algorithm. The similarity function and the best match algorithm are described and explained in detail above with reference to FIG. 1 so the technical functionalities of these components will not be repeated here but will be understood to also apply equivalently. The operations by the acquiring unit, the receiving unit, and the determining unit as described in these embodiments may be performed prior to the determining unit 210 determining the one or more anchors.

FIG. 3A and FIG. 3B are diagrams illustrating an exemplary labelled document and an exemplary unlabelled document, according to an embodiment of the present disclosure. As shown in FIGS. 3A and 3B, there is provided a labelled document 310 and an unlabelled document 320. In this embodiment, the labelled document 310 and the unlabelled document 320 are invoices (i.e. semi-structured documents).

In the labelled document 310, information is presented either in a field-element pair format or in a table format. For example, "Invoice #" and "00123456" are presented as a field-element pair, "Invoice date" and "2 Sep. 2021" are presented as a field-element pair, and "Total" and "4596" are presented as a field-element pair. In these examples, "Invoice #", "Invoice date", and "Total" are considered to be the fields while "00123456", "2 Sep. 2021", and "4596" are considered to be the corresponding elements.

In this example, the rest of the information is presented in a table format where elements correspond to one of the fields "Description", "Quantity", "Unit cost", and "Amount". In more detail, the elements "Canon 5D", "Memory card", and "Lens" correspond to "Description"—these are descriptions of the purchased items. The elements "1", "2", and "1" correspond to "Quantity"—these numbers indicate the quantity of each purchased item. The elements "2499", "149", and "1799" correspond to "Unit cost"—these numbers indicate the unit cost of each purchased item. The elements "2499", "298", and "1799" correspond to "Amount"—these numbers indicate the total amount (cost) for each purchased item.

As can be seen in FIG. 3A, all the elements are labelled (indicated in the drawing by way of boxes surrounding each element with corresponding reference numerals 311, 312, 313A-C, 314A-C, 315A-C, 316A-C, and 317). This can be achieved by way of receiving user input(s) indicating which words and/or terms (or which portions of the image pixels) in the document are to be regarded as elements.

The labels can indicate the field to which an element corresponds. In this example, the label for "00123456" (i.e. label 311) can indicate that the respective element corresponds to the field "Invoice #". Similarly, the label for "2 Sep. 2021" (i.e. label 312) can indicate that the respective element corresponds to the field "Invoice date". Labels 313A-C can indicate that the elements "Canon 5D", "Memory card", and "Lens" correspond to the field "Description", labels 314A-C can indicate that the elements "1", "2", and "1" correspond to the field "Quantity", labels 315A-C can indicate that the elements "2499", 149", and "1799" correspond to the field "Amount", and label 317 can indicate that the element "4596" corresponds to the field "Total".

Referring now to the unlabelled document 320 in FIG. 3A, it can be seen that the invoice follows a similar information structure as the labelled document 310. Specifically, the unlabelled document 320 includes the same fields: "Invoice #", "Invoice date", "Description", "Quantity", "Unit cost", "Amount", and "Total". By applying the computer-implemented method 100 as described above with reference to FIG. 1 or using the system 200 as described above with reference to FIG. 2, the elements in the unlabelled document can be identified and outputted.

An example of this output is illustrated in FIG. 3B, where the unlabelled document 320 is now provided with labels 321, 322, 323, 324, 325, 326, and 327, each corresponding to an identified element. In this case, the identified elements are "00123457", "3 Sep. 2021", "Sony ZV-1", "1", "699", "699", and "699". These identified elements correspond in their fields with the elements that have been labelled in the labelled document 310. Specifically, the element "00123457" corresponds to the element "00123456" in their field ("Invoice #"), the element "3 Sep. 2021" corresponds to the element "2 Sep. 2021" in the field ("Invoice date"), the element "Sony ZV-1" corresponds to the elements "Canon 5D", "Memory card", and "Lens" in their field ("Description"), the element "1" corresponds to the elements "1", "2", and "1" (labelled 314A-C) in their field ("Quantity"), Unit cost "699" (labelled 325) corresponds to the elements "2499", "149", "1799" (labelled 315A-C) in their field ("Unit cost"), the element "699" (labelled 326) corresponds to the elements "2499", "298", and "1799" (labelled 316A-C) in their field ("Amount"), and the element "699" (labelled 326) corresponds to the element "4596" in their field ("Total").

Figure 4:
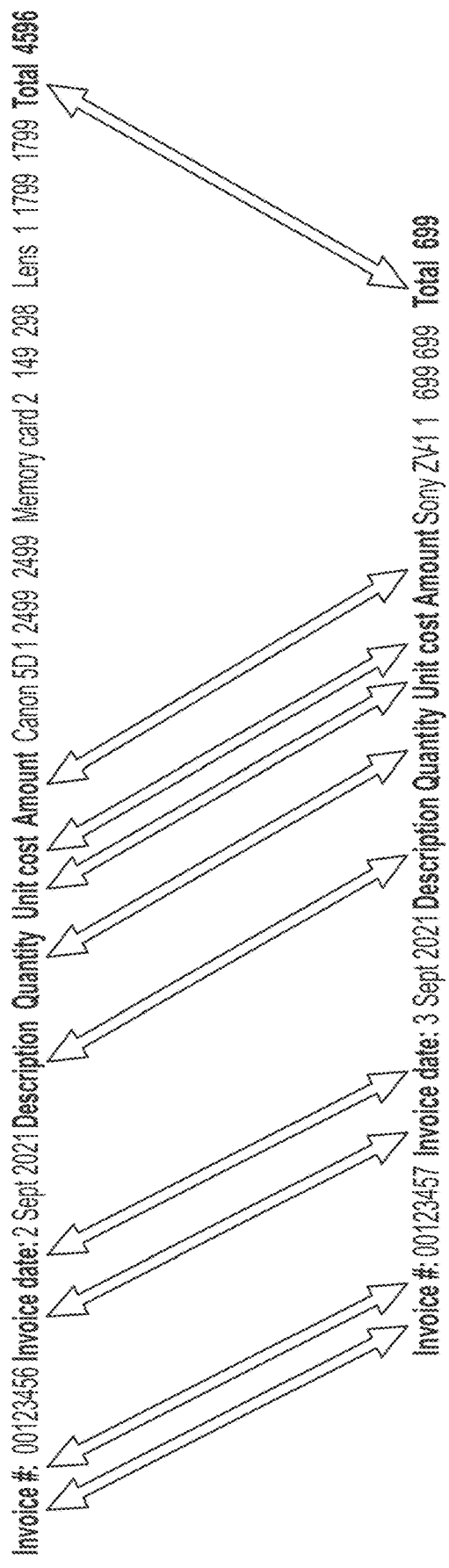
FIG. 4 is a diagram illustrating an exemplary process of determining anchors between the labelled document and the unlabelled document of FIGS. 3A and 3B.

FIG. 4 is a diagram illustrating an exemplary process of determining anchors between the labelled document and the unlabelled document of FIGS. 3A and 3B. FIG. 4 shows an upper linear text sequence and a lower linear text sequence. The upper linear text sequence can be generated by extracting all the words in the labelled document 310 and ordering the extracted words into a linear text sequence (e.g. by their reading order). Similarly, the lower linear text sequence can be generated by extracting all the words in the unlabelled document 320 and ordering the extracted words into a linear text sequence (e.g. by their reading order).

In this example, any word in the upper linear text sequence that corresponds to a labelled element (e.g. "00123456", "2 Sep. 2021", "Canon 5D", etc.) is ignored in the process of determining anchors. Alternatively, in other embodiments or examples, words that correspond to labelled elements can be removed from the linear text sequence in the process of determining anchors.

Once linear text sequences corresponding to the labelled and unlabelled documents 310, 320 have been generated, matches can be identified between the two linear text sequences. As indicated by the arrows between the upper and lower linear text sequences, ten matches have been identified in this example (from left to right): "Invoice", "#", "Invoice", "date", "Description", "Quantity", "Unit", "cost", "Amount", and "Total". It is noted that at least in this example, each single block of text may be regarded as a "word". Thus, "Invoice" and "#" are regarded as two (separate) words and similarly "Unit" and "cost" are regarded as two words, even though "Unit cost" is to be regarded collectively as a field.

Each match that has been identified is then designated as an anchor, thus rendering ten anchors in this example respectively corresponding to the words "Invoice", "#", "Invoice", "date", "Description", "Quantity", "Unit", "cost", "Amount", and "Total". Although the matches identified in this example are all exact matches, it will be appreciated that in some other examples or embodiments, matches may not be a 100% match (e.g. due to OCR errors).

FIG. 5 is a diagram illustrating an anchor determined from the exemplary process shown in FIG. 4. To illustrate an aspect of the present disclosure, FIG. 5 only focusses on the anchor as indicated by the overarching arrow which points at the words "Quantity" in both the labelled document 510 (which is the same as the labelled document 310 of FIGS. 3A and 3B) and the unlabelled document 520 (which is the same as the labelled document 320 of FIGS. 3A and 3B). This anchor is one of the matches identified via the process as described above with reference to FIG. 4.

As described above with reference to FIGS. 1 and 2, in some embodiments generation of an overall kernel comprises generating a convolution kernel for each of the one or more anchors, each convolution kernel ranging over all pairs of words and/or terms within and between the labelled document and the unlabelled document. More specifically, each convolution kernel can measure the similarity of words and/or terms within and between the labelled document and the unlabelled document, the similarity being a function of a distance of the respective word and/or term from the respective point of the anchor and a similarity in relative location with respect to the respective point of the anchor. Thus, in this present example, the convolution kernel for the anchor "Quantity" can measure the similarity of words and/or terms within the labelled document 510, within the unlabelled document 520, and between the labelled document 510 and the unlabelled document 520 with respect to the anchor.

As an example of how the similarity of words can be measured, FIG. 5 focusses on the similarity between "1" in the labelled document 510 and "1" in the unlabelled document 520 (as indicated by the lower arrow pointing at the two words). This similarity is a function of: the distance between "1" and "Quantity" in the labelled document 510 (as indicated by the short arrow in the document), the distance between "1" and "Quantity" in the unlabelled document 520 (as indicated by the short arrow in the document), and a similarity of the relative locations of the words "1" with respect to the words "Quantity" in each document.

As described above with reference to a number of mathematical equations, at least in some implementations words and/or terms are only considered similar when they are both close to the anchor and their position relative to the anchor is similar (by taking the product of the offset kernel and the relative kernel). In this case, due to the proximity of "1" and "Quantity" in the labelled document 510, the proximity of "1" and "Quantity" in the unlabelled document 520, and the similarity in relative locations of the words "1" with respect to the words "Quantity" in each document (as in both "1"s are located under the word "Quantity"), the similarity measured by the convolution kernel would be high. In contrast, the measured similarity between the word "4596" in the labelled document 510 and the word "00123457" in the unlabelled document 520 with respect to the same anchor would be lower, due to the fact that they are both further away from the word "Quantity" in the respective document and that their relative locations with respect to "Quantity" are different.

The convolution kernels for the other anchors can be generated in a similar manner, where each convolution kernel ranges over all pairs of words and/or terms within and between the labelled document and the unlabelled document with respect to the respective anchor. Once all the convolution kernels have been generated, they can be summed to generate an overall kernel for the purpose of identifying element(s) from the unlabelled document 520.

FIG. 6 is a diagram illustrating an exemplary labelled document and an exemplary unlabelled, according to an embodiment of the present disclosure. As shown in FIG. 6, there is provided a labelled document 610 and an unlabelled document 620. In this embodiment, the labelled document and the unlabelled document are invoices (i.e. semi-structured documents).

In the labelled document 610, some of the information is presented in a field-element pair format. For example, "Invoice Reference" and "237481709" are presented as a field-element pair, "Total Due" and "£1901.98" are presented as a field-element pair, and "Due Date" and "May 16 95" are presented as a field-element pair. In these examples, "Invoice Reference", "Total Due", and "Due Date" are considered to be the fields while "237481709", "£1901.98", and "May 16 95" are considered to be the corresponding elements.

Some other information in the labelled document 610 is presented in a table format where elements correspond to one of the fields "Description", "Cost", "Discount", "VAT", and "Amount". For example, the elements "Energy Bar", "100% Juice Apple Grape", and "Natural Mineral Water", etc. correspond to "Description"—these are descriptions of the purchased items.

Moreover, in this example, some information is presented as an element (without an explicit corresponding field). For example, the element "Bridge Interiors, 56 Bridge Ln, Ilkley LS29 9EU" is an address and therefore it is understood to correspond to an "Address" field. Although this field is not explicitly presented in the labelled document, the label 612 assigned to this element can indicate that the element corresponds to the field "Address".

As can be seen in FIG. 6, only some of the elements in the labelled document 610 are labelled (indicated in the drawing by way of boxes surrounding each element with corresponding reference numerals 611, 612, 613, 614, and 615)—this can be achieved by way of receiving user input(s) indicating which words and/or terms (or which portions of the image pixels) in the document are to be regarded as elements. In this example, not all of the elements in the labelled document 610 is assigned a label—this may be because some of the elements (non-labelled) are not of interest and therefore it is not desired or necessary to capture elements that correspond in field with these elements. For example, even though "Purchase Order" and "855496" are presented as a field-element pair, no label is assigned to "855496". As another example, none of the elements corresponding to "Cost" is labelled in the labelled document 610.

In this example, the labels can indicate the field to which an element corresponds. For example, as mentioned above, label 612 can indicate that the respective element corresponds to the field "Address". Similarly, the label for "237481709" (i.e. label 611) can indicate that the respective element corresponds to the field "Invoice Reference", the label for "£1901.98" (i.e. label 613) can indicate that the respective element corresponds to the field "Total Due", the label for "May 16 95" (i.e. label 614) can indicate that the respective element corresponds to the field "Due Date", and the labels 615 for the various elements located under "Description" can indicate that these elements correspond to the field "Description".

Referring now to the unlabelled document 620 in FIG. 6, it can be seen that the invoice follows a similar information structure as the labelled document. Specifically, the unlabelled document 620 includes the same fields, e.g. "Invoice Reference", "Total Due", "Due Date", and "Description". By applying the computer-implemented method 100 as described above with reference to FIG. 1 or using the system 200 as described above with reference to FIG. 2, the elements in the unlabelled document can be identified and outputted.

As an example of the anchor determination aspect of the data capture process, FIG. 7A shows a text anchor that is determined based on the labelled document and the unlabelled document of FIG. 6. The labelled document 710 in FIG. 7A corresponds to the labelled document 610 of FIG. 6, and the unlabelled document 720 corresponds to the unlabelled document 620 of FIG. 6. The text anchor in the present example is indicated by the arrow across the two documents which points at the word "Description" 711 in the labelled document 710 and the word "Description" 721 in the unlabelled document 721. This anchor may be determined by way of a number of steps:
- extracting all the words in the labelled document 710 and the unlabelled document 720 (e.g. using OCR);
- generating a first linear text sequence by ordering words contained in the labelled document 710 into a linear text sequence;
- generating a second linear text sequence by ordering words contained in the unlabelled document 720 into a linear text sequence;
- identifying a match between the first and second linear text sequences (ignoring words that correspond to labelled element, e.g. "Energy Bar"); and
- designating the matched words as the anchor.

Once this anchor ("Description") is determined, a convolution kernel for the anchor can be generated, where the convolution kernel ranges over all pairs of words and/or terms within and between the labelled document 710 and the unlabelled document 720. The convolution kernel measures the similarity of words and/or terms within and between the labelled document and the unlabelled document, the similarity being a function of a distance of the respective word from the respective point of the anchor and a similarity in relative location with respect to the respective point of the anchor. For example, for these two documents, the term "Energy Bar" 712 in the labelled document and the word "Surdegbrodmix" 722 would have a high degree of measured similarity (with respect to the anchor "Description") due to the fact that these are both in close proximity with the word "Description" in their respective document, and that their relative locations with respect to the word "Description" are similar (i.e. both "Energy Bar" and "Surdegbrodmix" are directly underneath "Description" in respective documents).

The convolution kernels for the other anchors can be generated in a similar manner, where each convolution kernel ranges over all pairs of words and/or terms within and between the labelled document and the unlabelled document with respect to the respective anchor. Once all the convolution kernels have been generated, they can be summed to generate an overall kernel for the purpose of identifying element(s) from the unlabelled document 720.

As another example of the anchor determination aspect of the data capture process, FIG. 7B shows a visual anchor that is determined based on the labelled document 710 and the unlabelled document 720. The visual anchor in the present example is indicated by the arrow across the two documents which points at the horizontal separator line 713 in the labelled document 710 and the horizontal separator line 723 in the unlabelled document 720. This anchor may be determined by way of identifying a visual feature that is present in both the labelled document and the unlabelled document and designating the identified visual feature as the anchor. In this example, the identified visual feature is the horizontal separator line in the two documents. The identification of the visual feature may be based on an image alignment algorithm such as one that is based on SIFT.

Once this visual anchor is determined, a convolution kernel for the anchor can be generated, where the convolution kernel ranges over all pairs of words and/or terms within and between the labelled document 710 and the unlabelled document 720. The convolution kernel measures the similarity of words and/or terms within and between the labelled document and the unlabelled document, the similarity being a function of a distance of the respective word from the respective point of the anchor and a similarity in relative location with respect to the respective point of the anchor.

For example, the term "100% Juice Apple Grape" in the labelled document 710 and the term "Protein Plus Bar Cookies & Cream Flavour" in the unlabelled document 720 would have a high degree of measured similarity (with respect to the visual anchor) due to the fact that these terms are in relatively close proximity to the horizontal separator line in their respective document, and that their relative locations with respect to the horizontal separator line are similar. In contrast, the term "Pepper Mayonnaise" in the labelled document 710 and the term "Onion Rings" in the unlabelled document would have a lower degree of measured similarity (with respect to the visual anchor) due to the fact that at least the term "Pepper Mayonnaise" being located further away from the horizontal separator line, and that the relative locations of these terms ("Pepper Mayonnaise" vs "Onion Rings") being substantially different.

FIG. 8 shows a labelled document 810, a first unlabelled document 820, and a second unlabelled document 830. The labelled document 810 corresponds to the labelled document 610 shown in FIG. 6, and the first unlabelled document 820 corresponds to the unlabelled document 620 shown in FIG. 6. The second unlabelled document 630 is also an invoice that adopts a similar information structure as the other two documents. In this example, an anchor has been determined for the labelled document 810 and the unlabelled document 820, which is indicated by the arrow pointing at the box 816 (in the labelled document 810) and the box 826 (in the first unlabelled document 820) and by the anchor symbol in these two documents. This anchor can be used as reference when determining an anchor for a new unlabelled document (e.g. one that belongs to the same batch of unlabelled documents as 820), which in this case is the second unlabelled document 830. It can be seen in FIG. 8 that a new anchor, indicated by the arrow pointing at the box 816 (in the labelled document 810) and the box 836 (in the second unlabelled document 830) and by the anchor symbols in the two documents, can be determined in this manner.

FIG. 9 is a diagram illustrating a topology for performing data capture, according to an embodiment of the present disclosure. Topology 900 may include client computing devices 905 and a server 920 that is configured to be communicatively coupled over network 910.

The network 910 may be wired or wireless network such as the Internet, an intranet, a Local Area Network (LAN), a Wide Area Network (WAN), a Near-field Communication (NFC) network, Bluetooth, infrared, radio frequency, a cellular network or another type of network. It will be understood that the network 910 may be a combination of multiple different kinds of wired or wireless networks.

Each client computing device 905 may be a smart phone, tablet computer, laptop computer, a computer, personal data assistant, or any other type of mobile device with a hardware processor that are configured to process instructions and connected to one or more portions of the network 910. Each client computing device 905 may have a graphical user interface that is configured to allow a user to interact with a processor of the client computing device 905.

The server 920 may include physical computing devices residing at a particular location or may be deployed in a cloud computing network environment. In the present disclosure, "cloud computing" may be defined as a model for enabling ubiquitous, convenient, on-demand network access to a shared pool of configurable computing resources (e.g. networks, servers, storage, applications, and services) that can be rapidly provisioned via virtualisation and released with minimal management effort or service provider interaction, and then scaled accordingly. A cloud model can be composed of various characteristics (e.g. on-demand self-service, broad network access, resource pooling, rapid elasticity, measured service, etc.), service models (e.g. Software as a Service (SaaS), Platform as a Service (PaaS), Infrastructure as a Service (IaaS), and deployment models (e.g. private cloud, community cloud, public cloud, hybrid cloud, etc.). The server 920 may include any combination of one or more computer-usable or computer-readable media. In some embodiments, the server 920 may be configured to perform data capture. For example, the server 920 may perform at least part of the method 100 as described above with reference to FIG. 1.

It will be appreciated that this description is by way of example only; alterations and modifications may be made to the described embodiment without departing from the scope of the disclosure as defined in the claims.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. For example, in some embodiments there may be provided a computer program product comprising instructions which, when the program is executed by a processor, cause the processor to carry out the method described with respect to FIG. 1. As another example, in some embodiments there may be provided a computer-readable storage medium comprising instructions which, when executed by a computer, cause the computer to carry out the steps of the method as described in FIG. 1. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system". Furthermore, embodiments of the present disclosure may take the form of a computer program product embodied in any tangible medium of expression having computer-usable program code embodied in the medium.

Although described in connection with an exemplary computing system environment, embodiments of the present disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers (e.g. desktop computers), server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Any combination of one or more computer-usable or computer-readable media may be utilised. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of embodiments of the present disclosure may be written in any combination of one or more programming languages.

The flowcharts and block diagrams illustrate the architecture, functionality, and operation of possible implementations of systems, methods, and computer program products according to various embodiments of the present disclosure. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

The following is a list of embodiments of the present disclosure:

1. A computer-implemented method for performing data capture in an unlabelled document based on a labelled document, wherein the labelled document contains one or more elements each labelled with respect to a field, the method comprising:
   determining one or more anchors, wherein an anchor comprises a pair of points that match between the labelled document and the unlabelled document;
   generating an overall kernel using the determined one or more anchors; and
   identifying, using the overall kernel in a kernel machine, one or more elements to be captured in the unlabelled document, wherein the one or more elements to be captured correspond in field to the one or more labelled elements contained in the labelled document.

2. The method according to embodiment 1, wherein generating the overall kernel comprises:
   generating a convolution kernel for each of the one or more anchors; and
   generating the overall kernel by summing the one or more convolution kernels.

3. The method according to embodiment 2, wherein the overall kernel is a weighted sum of the one or more convolution kernels.

4. The method according to embodiment 2 or embodiment 3, wherein each convolution kernel ranges over all pairs of words within and between the labelled document and the unlabelled document.

5. The method according to any one of embodiments 2 to 4, wherein each convolution kernel measures the similarity of words within and between the labelled document and the unlabelled document, wherein the similarity is a function of a distance of the respective word from the respective point of the anchor and a similarity in relative location with respect to the respective point of the anchor.

6. The method according to any one of embodiments 2 to 5, wherein the labelled document is defined as $d=d_1$, the unlabelled document is defined as $d=d_2$, d being a document, and each document is defined as a sequence of words $w_d=w_{d,1}, \ldots, w_{d,n_d}$, $n_d$ being the number of words in a respective document, and wherein each convolution kernel is defined as $k(w_{d,i}, w_{d',j}; a) = k_{off}(z) k_{off}(z') k_{rel}(z, z')$, each pair of words being represented as $(w_{d,i}, w_{d',j})$, and wherein a is the respective anchor and is defined as $a=(a_1, a_2)$, $a_1$ being the location of a corresponding point of the anchor in $d_1$ and $a_2$ being the location of a corresponding point of the anchor in $d_2$, and wherein $$k_{off}(z) = k_{RBF}(\|zA_{off}\|_2), k_{rel}(z, z') = k_{RBF}(\|(z-z')A_{rel}\|_2), \text{ and}$$

$$k_{RBF}(r) = e^{-\frac{r^2}{2}},$$

wherein $$A_{off} = \begin{pmatrix} \frac{1}{\sigma_{x,off}} & 0 \\ 0 & \frac{1}{\sigma_{y,off}} \end{pmatrix} \text{ and } A_{rel} = \begin{pmatrix} \frac{1}{\sigma_{x,rel}} & 0 \\ 0 & \frac{1}{\sigma_{y,rel}} \end{pmatrix},$$

and wherein r is a distance and $\sigma$ is a length-scale.

7. The method according to embodiment 6, wherein $d=d'$ and/or $d \neq d'$.

8. The method according to any one of the preceding embodiments, further comprising, subsequent to identifying the one or more elements in the unlabelled document, at least one of:
receiving a user input confirming or rejecting results of the identification; and
receiving a user input modifying results of the identification.

9. The method according to any one of the preceding embodiments, wherein the labelled document further comprises the one or more fields indicated by the one or more labels.

10. The method according to any one of the preceding embodiments, further comprising determining, for each of the identified one or more elements, a field to which the respective element corresponds, wherein the determination uses the overall kernel in a kernel machine.

11. The method according to embodiment 10, wherein a plurality of elements are identified in the unlabelled document, and wherein determining a field to which each of the identified elements corresponds comprises grouping the plurality of identified elements into one or more groups, each group corresponding a field.

12. The method according to embodiment 11, wherein grouping the plurality of identified elements is based on a word grouping algorithm.

13. The method according to embodiment 11 or embodiment 12, wherein grouping the plurality of identified elements comprises:
generating a linear text sequence of the plurality of identified elements in the unlabelled document;
determining the argmax classification of each element in the generated linear text sequence; and
grouping every maximal contiguous subsequence of elements in the generated linear text sequence that share an argmax classification into a respective group.

14. The method according to any one of embodiments 11 to 13, further comprising assigning a respective row identifier to each element in a group based on a relative order of the element in the group.

15. The method according to any one of embodiments 9 to 14, wherein the one or more fields and one or more elements in the labelled document are presented in an information structure, and the method further comprises outputting the identified one or more elements and their corresponding fields in the same information structure.

16. The method according to any one of embodiments 9 to 15, further comprising, prior to determining one or more anchors, acquiring a schema that defines the one or more fields contained in the labelled document and whether elements corresponding to each field in the labelled document are presented in a table.

17. The method according to any one of the preceding embodiments, wherein determining an anchor comprises:
extracting all the words in the labelled document and the unlabelled document;
generating a first linear text sequence by ordering words contained in the labelled document into a linear text sequence and removing any word that corresponds to a labelled element;
generating a second linear text sequence by ordering words contained in the unlabelled document into a linear text sequence;
identifying a match between the first and second linear text sequences; and
designating the matched words as the anchor.

18. The method according to according to embodiment 17, wherein a match between the first and second linear text sequence is one that exceeds a predetermined similarity threshold and a predetermined alignment threshold.

19. The method according to embodiment 17 to embodiment 18, wherein extracting the words in the labelled document and the unlabelled document is based on Optical Character Recognition, OCR.

20. The method according to any one of embodiments 17 to 19, wherein ordering words contained in the labelled and unlabelled documents is performed using a reading order algorithm.

21. The method according to any one of embodiments 17 to 20, wherein each of the one or more anchors is defined as the correspondence between the centre of the respective matched word in the labelled document and the centre of the respective matched word in the unlabelled document.

22. The method according to any one of embodiments 17 to 21, wherein identifying a match between the first and second linear text sequences is based on an alignment algorithm.

23. The method according to embodiment 22, wherein the alignment algorithm is similar to or equivalent to the Needleman-Wunsch algorithm.

24. The method according to any one of the preceding embodiments, wherein determining an anchor comprises:
identifying a visual feature that is present in both the labelled document and the unlabelled document; and
designating the identified visual feature as the anchor.

25. The method according to embodiment 24, wherein identifying the visual feature is based on an image alignment algorithm.

26. The method according to embodiment 25, wherein the image alignment algorithm is based on at least one of:

a keypoint detector, a local invariant descriptor, and a keypoint matching process.

27. The method according to any one of the preceding embodiments, wherein determining an anchor comprises:
placing a plurality of points around the boundary of the unlabelled document and a same number of points around the boundary of the labelled document;
identifying a match between a point in the labelled document and a point in the unlabelled document; and
designating the matched points as the anchor.

28. The method according to any one of the preceding embodiments. further comprising, prior to determining one or more anchors, receiving user input assigning the one or more labels to the elements of the labelled document.

29. The method according to any one of the preceding embodiments, further comprising, prior to determining one or more anchors:
acquiring a plurality of candidate labelled documents; and
determining the labelled document from the acquired candidate labelled documents based on a similarity metric between each of the plurality of candidate labelled documents and the unlabelled document.

30. The method according to any one of the preceding embodiments, wherein the kernel machine comprises at least one of: a Support-vector machine, SVM, Regularized Kernel Discriminant Analysis, RKDA, and Gaussian process, GP.

31. The method according to any one of the preceding embodiments, wherein the labelled document is in the form of a PDF document or an image.

32. A system for performing data capture in an unlabelled document based on a labelled document, wherein the labelled document contains one or more elements each labelled with respect to a field, the system comprising:
a determining unit configured to determine one or more anchors, wherein an anchor comprises a pair of corresponding points that match between the labelled document and the unlabelled document;
a generating unit configured to generate an overall kernel using the determined one or more anchors; and
an identifying unit configured to identify, using the overall kernel in a kernel machine, one or more elements to be captured in the unlabelled document that contain information to be captured, wherein the one or more elements to be captured corresponds in field to the one or more labelled elements contained in the labelled document.

33. A computer-readable storage medium comprising instructions which, when executed by a computer, cause the computer the carry out the steps of the method of any one of embodiments 1 to 31.

The invention claimed is:

1. A computer-implemented method (100) for performing data capture in an unlabeled document based on a labeled document, wherein the labeled document contains one or more elements each labeled with respect to a field, the method comprising:
determining (S110) one or more anchors, wherein an anchor comprises a pair of location points of words or visual features in the labeled document and the unlabeled document that match;
generating (S120) an overall kernel using the determined one or more anchors; and
identifying (S130), using a kernel machine that is trained using at least a subset of matrix entries for the overall kernel, one or more elements to be captured in the unlabeled document, wherein the one or more elements to be captured correspond in field to the one or more labeled elements contained in the labeled document.

2. The method according to claim 1, wherein generating (S120) the overall kernel comprises:
generating a convolution kernel for each of the one or more anchors; and
generating the overall kernel by summing the one or more convolution kernels.

3. The method according to claim 2, wherein each convolution kernel measures the similarity of words within and between the labeled document and the unlabeled document, wherein the similarity is a function of a distance of the respective word from the respective location point of the anchor and a similarity in relative location with respect to the respective location point of the anchor.

4. The method according to claim 1, wherein the labeled document further comprises the one or more fields indicated by the one or more labels.

5. The method according to claim 4, wherein the one or more fields and one or more elements in the labeled document are presented in an information structure, and the method further comprises outputting the identified one or more elements and their corresponding fields in the same information structure.

6. The method according to claim 4, further comprising, prior to determining (S110) one or more anchors, acquiring a schema that defines the one or more fields contained in the labeled document and whether elements corresponding to each field in the labeled document are presented in a table.

7. The method according to claim 1, further comprising determining, for each of the identified one or more elements, a field to which the respective element corresponds, wherein the determination uses the kernel machine.

8. The method according to claim 7, wherein a plurality of elements are identified in the unlabeled document, and wherein determining a field to which each of the identified elements corresponds comprises grouping the plurality of identified elements into one or more groups, each group corresponding to a field.

9. The method according to claim 8, wherein grouping the plurality of identified elements comprises:
generating a linear text sequence of the plurality of identified elements in the unlabeled document;
determining the argmax classification of each element in the generated linear text sequence; and
grouping every maximal contiguous subsequence of elements in the generated linear text sequence that share an argmax classification into a respective group.

10. The method according to claim 7, wherein the one or more fields and one or more elements in the labeled document are presented in an information structure, and the method further comprises outputting the identified one or more elements and their corresponding fields in the same information structure.

11. The method according to claim 7, further comprising, prior to determining (S110) one or more anchors, acquiring a schema that defines the one or more fields contained in the labeled document and whether elements corresponding to each field in the labeled document are presented in a table.

12. The method according to claim 1, wherein determining (S110) an anchor comprises:

extracting all the words in the labeled document and the unlabeled document;

generating a first linear text sequence by ordering words contained in the unlabeled document into a linear text sequence and removing any word that corresponds to a labeled element;

generating a second linear text sequence by ordering words contained in the unlabeled document into a linear text sequence;

identifying a match between the first and second linear text sequences; and designating the matched words as the anchor.

13. The method according to claim 1, wherein determining (S110) an anchor comprises:

identifying a visual feature that is present in both the labeled document and the unlabeled document; and designating the identified visual feature as the anchor.

14. The method according to claim 13, further comprising, prior to determining (S110) one or more anchors:

acquiring a plurality of candidate labeled documents; and determining the labeled document from the acquired candidate labeled documents based on a similarity metric between each of the plurality of candidate labeled documents and the unlabeled document.

15. The method according to claim 13, further comprising, prior to determining (S110) one or more anchors:

acquiring a plurality of candidate labeled documents; and determining the labeled document from the acquired candidate labeled documents based on a similarity metric between each of the plurality of candidate labeled documents and the unlabeled document.

16. The method according to claim 1, wherein determining (S110) an anchor comprises:

placing a plurality of points around the boundary of the unlabeled document and a same number of points around the boundary of the labeled document;

identifying a match between a point in the labeled document and a point in the unlabeled document; and designating the matched points as the anchor.

17. The method according to claim 16, further comprising, prior to determining (S110) one or more anchors:

acquiring a plurality of candidate labeled documents; and determining the labeled document from the acquired candidate labeled documents based on a similarity metric between each of the plurality of candidate labeled documents and the unlabeled document.

18. The method according to claim 1, further comprising, prior to determining (S110) one or more anchors:

acquiring a plurality of candidate labeled documents; and determining the labeled document from the acquired candidate labeled documents based on a similarity metric between each of the plurality of candidate labeled documents and the unlabeled document.

19. A system (200) for performing data capture in an unlabeled document based on a labeled document, wherein the labeled document contains one or more elements each labeled with respect to a field, the system comprising:

a determining unit (210) configured to determine one or more anchors, wherein an anchor comprises a pair of location points of words or visual features in the labeled and unlabeled document that match;

a generating unit (220) configured to generate an overall kernel using the determined one or more anchors; and an identifying unit (230) configured to identify, using a kernel machine that is trained using at least a subset of matrix entries for the overall kernel, one or more elements to be captured in the unlabeled document that contain information to be captured, wherein the one or more elements to be captured corresponds in field to the one or more labeled elements contained in the labeled document.

20. A non-transitory computer-readable storage medium comprising instructions which, when executed by a computer, cause the computer to carry out a method (100) for performing data capture in an unlabeled document based on a labeled document, wherein the labeled document contains one or more elements each labelled with respect to a field, the method comprising:

determining (S110) one or more anchors, wherein an anchor comprises a pair of location points of words or visual features in the labeled and unlabeled document that match;

generating (S120) an overall kernel using the determined one or more anchors; and identifying (S130), using a kernel machine that is trained using at least a subset of matrix entries for the overall kernel, one or more elements to be captured in the unlabeled document, wherein the one or more elements to be captured correspond in field to the one or more labeled elements contained in the labeled document.

* * * * *